(12) United States Patent
Unnikrishnan et al.

(10) Patent No.: US 11,144,141 B2
(45) Date of Patent: Oct. 12, 2021

(54) INPUT DEVICES AND METHODS FOR PROVIDING A SCROLLING INPUT TO AN APPLICATION

(71) Applicant: RAZER (ASIA-PACIFIC) PTE. LTD., Singapore (SG)

(72) Inventors: Sreenath Unnikrishnan, Singapore (SG); Jian Yao Lien, Singapore (SG); Pierre Zeloon Lye, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/476,849

(22) PCT Filed: Jan. 10, 2017

(86) PCT No.: PCT/SG2017/050012
§ 371 (c)(1),
(2) Date: Jul. 9, 2019

(87) PCT Pub. No.: WO2018/132061
PCT Pub. Date: Jul. 19, 2018

(65) Prior Publication Data
US 2020/0225770 A1    Jul. 16, 2020

(51) Int. Cl.
*G06F 3/0362* (2013.01)
*G06F 3/0354* (2013.01)
*G06F 3/0485* (2013.01)

(52) U.S. Cl.
CPC ........ *G06F 3/0362* (2013.01); *G06F 3/03543* (2013.01); *G06F 3/03547* (2013.01); *G06F 3/0485* (2013.01)

(58) Field of Classification Search
CPC ..... G06F 3/0362; G06F 3/038; G06F 3/03549
See application file for complete search history.

(56) References Cited

U.S. PATENT DOCUMENTS

| 6,636,197 | B1 * | 10/2003 | Goldenberg | G05G 1/08 345/156 |
| 7,277,084 | B2 | 10/2007 | Hinckley et al. | |
| 8,686,944 | B1 | 4/2014 | Charlton et al. | |
| 8,935,630 | B2 | 1/2015 | Wroblewski | |
| 9,013,514 | B2 | 4/2015 | Bochniak | |
| 2003/0038018 | A1 * | 2/2003 | Lin | G06F 3/0362 200/11 TW |

(Continued)

FOREIGN PATENT DOCUMENTS

WO    WO 2013/101472 A1    7/2013

OTHER PUBLICATIONS

International Search Report and Written Opinion, dated Oct. 30, 2017, for the corresponding International Application No. PCT/SG2017/050012 in 9 pages.

(Continued)

*Primary Examiner* — Kevin M Nguyen
(74) *Attorney, Agent, or Firm* — Polsinelli PC

(57) ABSTRACT

According to various embodiments, there is provided an input device for providing a scrolling input to an application, the input device including a scroll wheel and a control circuit configured to provide exactly one step of scrolling input for every instance of rotation of the scroll wheel regardless of an angle that the scroll wheel is rotated through in the instance of rotation.

17 Claims, 3 Drawing Sheets

(56) References Cited

U.S. PATENT DOCUMENTS

| | | | |
|---|---|---|---|
| 2003/0080942 A1 | 5/2003 | Danzyger et al. | |
| 2006/0001657 A1 | 1/2006 | Monney et al. | |
| 2007/0242057 A1* | 10/2007 | Zadesky | G06F 3/0485 345/173 |
| 2009/0100373 A1* | 4/2009 | Pixley | G06F 3/04855 715/786 |
| 2009/0102817 A1* | 4/2009 | Bathiche | G06F 3/0362 345/184 |
| 2010/0058223 A1* | 3/2010 | Price | G06F 3/0362 715/784 |
| 2010/0127983 A1 | 5/2010 | Irani et al. | |
| 2011/0128226 A1 | 6/2011 | Jensen | |
| 2011/0187645 A1 | 8/2011 | Lin | |
| 2012/0249426 A1 | 10/2012 | Lin et al. | |
| 2012/0266069 A1 | 10/2012 | Moshiri et al. | |
| 2013/0311939 A1* | 11/2013 | Hsu | G06F 3/0383 715/784 |
| 2014/0253449 A1 | 9/2014 | Bochniak | |
| 2016/0180820 A1 | 6/2016 | Pascucci et al. | |
| 2017/0118640 A1* | 4/2017 | Lee | H04W 12/06 |
| 2017/0285768 A1* | 10/2017 | Bruwer | G06F 3/0362 |

OTHER PUBLICATIONS

"Change the mouse wheel scrollingacceleration", Ask Different—Answers for your Apple questions. http://apple.stackexchange.com/questions/23189/change-the-mouse-wheel-scrolling-acceleration, in 6 pages.

"Quantitative Analysis of Scrolling Techniques", ACM DL Digital Library, published by the Association for Computing Machinery, 2019, http://dl.acm.org/citation.cfm?id=503389 in 1 page.

Extended European Search Report dated Nov. 29, 2019, 10 pages, for the corresponding European Patent Application No. 17891110.3.

\* cited by examiner

INPUT DEVICES AND METHODS FOR PROVIDING A SCROLLING INPUT TO AN APPLICATION

TECHNICAL FIELD

Various embodiments relate to input devices and methods for providing a scrolling input to an application.

BACKGROUND

Input devices such as computer mice, may be provided with a scroll wheel. The scroll wheel may be used to provide scrolling inputs in a computer application running on a computing device coupled to the input device. The scroll wheel may be useful for providing a quick selection of an item from a menu, or for scrolling through a page. In first person shooter (FPS) games, the scroll wheel is often used for scrolling through skills, items or weapons to be used. In simulator games, the scroll wheel may also be used to swing a field of vision. An amount of rotation of the scroll wheel is translated into an input, for example, the amount of rotation indicates the number of items to scroll through. To provide a tactile feedback to a user on the amount of rotation, the scroll wheel is often designed with detents so that the scroll wheel turns in discrete steps. Such scroll wheels may be known as ratchet-type scroll wheels. Ratchet-type scroll wheels typically have 24 steps per revolution of 360°, in other words, 15° of rotation per step. However, when playing a fast-paced game, a gamer may easily over rotate the scroll wheel by more than a single scrolling step due to the small degree of rotational movement per scrolling step. When the gamer over rotates the scroll wheel, he would miss his desired menu item and would then have to waste precious time to back scroll or re-scroll to his desired menu item. Spending time in back-scrolling or re-scrolling can be detrimental to the game play, especially during competitions.

SUMMARY

According to various embodiments, there may be provided an input device for providing a scrolling input to an application, the input device including a scroll wheel and a control circuit configured to provide exactly a predetermined number of steps of scrolling input for every instance of rotation of the scroll wheel regardless of an angle that the scroll wheel is rotated through in the instance of rotation.

According to various embodiments, there may be provided a method for providing a scrolling input to an application, the method including: providing a scroll wheel; and providing exactly a predetermined number of steps of scrolling input for every instance of rotation of the scroll wheel regardless of an angle (in other words: a degree or any degree) that the scroll wheel is rotated through in the instance of rotation.

According to various embodiments, there may be provided a non-transitory computer readable medium having stored therein instructions which when executed by a processor, causes the processor to perform a method for providing a scrolling input using an input device, the method including: providing exactly a predetermined number of steps of scrolling input for every instance of rotation of a scroll wheel of the input device, regardless of an angle that the scroll wheel is rotated through in the instance of rotation.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
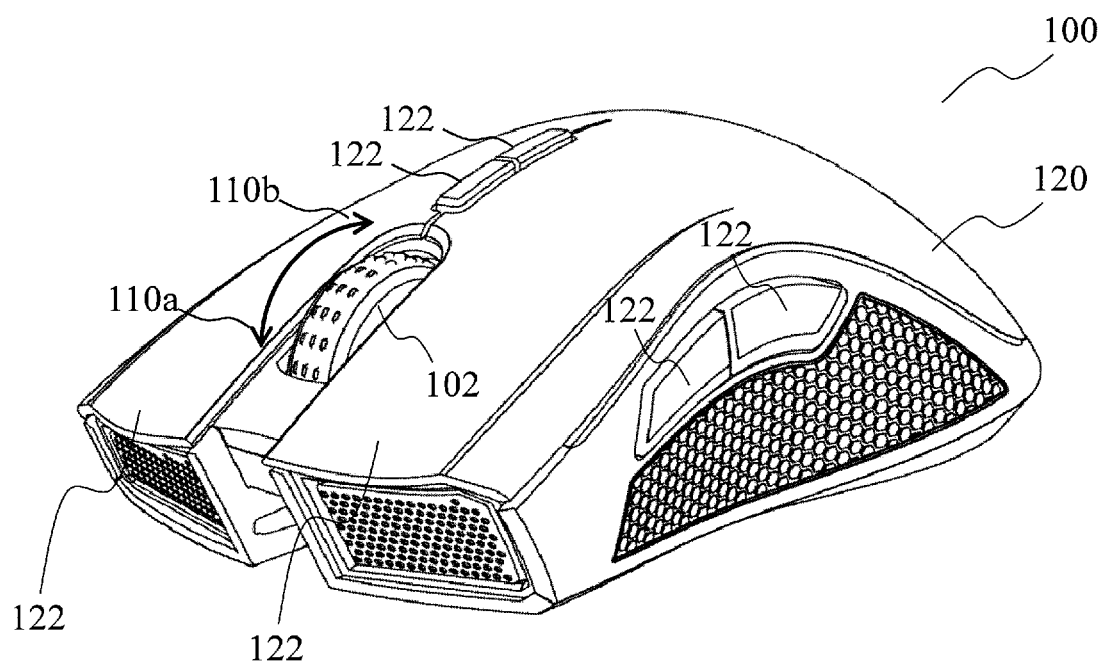
FIG. 1 shows an input device according to various embodiments.

Embodiments described below in context of the input devices are analogously valid for the respective methods, and vice versa. Furthermore, it will be understood that the embodiments described below may be combined, for example, a part of one embodiment may be combined with a part of another embodiment.

It will be understood that any property described herein for a specific input device may also hold for any input device described herein. It will be understood that any property described herein for a specific method may also hold for any method described herein. Furthermore, it will be understood that for any input device or method described herein, not necessarily all the components or steps described must be enclosed in the device or method, but only some (but not all) components or steps may be enclosed.

In this context, the input device as described in this description may include a memory which is for example used in the processing carried out in the input device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments provide for a new type of input device and method for scrolling that can address the abovementioned problems.

Input devices such as computer mice, may be provided with a scroll wheel. The scroll wheel may be used to provide scrolling inputs in a computer application running on a computing device coupled to the input device. The scroll wheel may be useful for providing a quick selection of an item from a menu, or for scrolling through a page. In first person shooter (FPS) games, the scroll wheel is often used for scrolling through skills, items or weapons to be used. In simulator games, the scroll wheel may also be used to swing a field of vision. An amount of rotation of the scroll wheel is translated into an input, for example, the amount of rotation indicates the number of items to scroll through. To provide a tactile feedback to a user on the amount of rotation, the scroll wheel is often designed with detents so that the scroll wheel turns in discrete steps. Such scroll wheels may be known as ratchet-type scroll wheels. Ratchet-type scroll wheels typically have 24 steps per revolution of 360°, in other words, 15° of rotation per step. However, when playing a fast-paced game, a gamer may easily over rotate the scroll wheel by more than a single scrolling step due to the small degree of rotational movement per scrolling step. When the gamer over rotates the scroll wheel, he would miss his desired menu item and would then have to waste precious time to back scroll or re-scroll to his desired menu item. Spending time in back-scrolling or re-scrolling can be detrimental to the game play, especially during competitions. Therefore, there is a need for a new type of input device and method for scrolling that can address the abovementioned problems.

According to various embodiments, a method of providing a scrolling input to an application may be provided. The method may be implemented through either a software installed on a computing device or a firmware integrated into an input device. Alternatively, the driver software or firmware of the input device need not be programmed to support the method. The method may also be implemented by downloading user configuration settings from an online database. The computing device may detect the input device and download the user configuration settings based on a profile of the input device. The method may be implemented on an input device by installing a driver for the input device. The method may be implementable across a wide range of input devices, including any gaming mouse. The default operating mode of the input device may be a multi-step scrolling control mode, whereby the number of steps of scrolling corresponds to the amount of rotation of the scroll wheel. The method may include disabling the default operating mode and activate a single-step scrolling control mode. In the single-step scrolling control mode, the amount of rotation of the scroll wheel or the number of activated mouse scroll wheel steps may be disregarded and instead, consider any mouse scrolling action as a predetermined number of steps of scrolling. For example, the predetermined number of steps of scrolling may be a single step of scrolling such that if the input device has a ratchet scroll wheel, one rotational movement of the scroll wheel in one direction may translate into exactly one unit of scrolling no matter how many steps the scroll wheel registers in that one rotational movement. The method may be applicable to a ratchet scroll wheel, as well as to a ratchet-less freewheeling scroll wheel. The single step scrolling control mode may be user-selectable via either via a pre-programmed input button. For example, the pre-programmed input button may be a "single-step scrolling control mode" enable/disable button or a device profile change button. The input device may include a plurality of device profiles, one of which may be programmed to enable the single-step scrolling control mode. The device profile may be stored on the input device itself or may be provided through a supported software interface.

FIG. 1 shows an input device 100 according to various embodiments. The input device 100 may include a housing 120, a scroll wheel 102 and at least one button 122. The housing 120 may be shaped to fit into a user's palm ergonomically. The buttons 122 may be positioned on a top surface of the housing 120 or at a side of the housing 120. The buttons 122 may be depressible. The user may click or depress the buttons 122 to send a user command to a computing device coupled to the input device 100. The scroll wheel 102 may be partially housed within the housing 120. The scroll wheel 102 may partially extend out of the housing 120 so that a user can touch the exposed part of the scroll wheel 102. A user may use the scroll wheel 102 make a selection in an application running on the computing device, and then use one button 122 to click the selection. The scroll wheel 102 may be rotatable either upwards according to arrow 110a or downwards according to arrow 110b. The input device 100 may further include a control circuit enclosed in the housing 120. The control circuit may provide inputs to the computing device based on a depression of any button 122 or a scrolling of the scroll wheel 102. The control circuit may provide scrolling inputs to the computing device based on measurements of the rotation of the scroll wheel 102. The input device may be user-configurable to function in a single-step mode or a multi-step mode. The single-step mode may also be referred herein as the first scrolling control mode while the multi-step mode may also be referred herein as the second scrolling control mode. The multi-step mode, i.e. second scrolling control mode, may be the default mode of operation of the input device. In the single-step mode, the control circuit detects every instance of rotation of the scroll wheel 102 and converts each instance of rotation into exactly a predetermined number of scrolling steps. For example, the predetermined number of scrolling steps may be one, that is, each rotation translates into a single scrolling step. The predetermined number of scrolling steps may be any other number, for example, two, that is, each rotation translates into two scrolling steps. The predetermined number of scrolling steps may be user-configurable, through for example, a physical user interface on the input device, or through a software application running on a computing device. Each instance of rotation may include any amount of rotation and still be considered as a single instance of rotation consisting of the predetermined number of scrolling steps. When an instance of rotation is detected, a "single step" command may be sent to the computing device, also referred herein as the host computer. An instance of rotation may be detected when any one of the following conditions is fulfilled: (i) first detected physical rotational movement step of the scroll wheel 102 after a pre-determined period of non-movement or opposite rotational movement; (ii) detection of an increase in the current physical rotational movement step rate of the scroll wheel 102, after a pre-determined period of lower rotational movement step rate or opposite rotational movement step rate. In other words, the "single step" command may be generated based on an analysis of the acceleration, deceleration or step rate patterns of the scroll wheel 102. In the multi-step mode, the control circuit detects the amount of rotation, i.e. degree of rotation of the scroll wheel 102, and converts the rotation into a plurality of scrolling steps corresponding to the angle of rotation.

Figure 2:
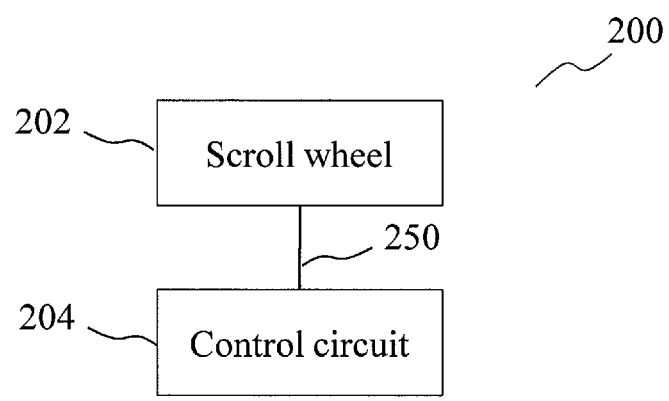
FIG. 2 shows a conceptual diagram of an input device according to various embodiments.

FIG. 2 shows a conceptual diagram of an input device 200 according to various embodiments. The input device 200 may similar to, or identical to the input device 100. The input device 200 may include a scroll wheel 202 and a control circuit 204. The scroll wheel 202 may identical to, or similar to, the scroll wheel 102. The control circuit 204 may be configured to provide exactly a predetermined number of steps of scrolling input for every instance of rotation of the scroll wheel 202 regardless of an angle that the scroll wheel 202 is rotated through in the instance of rotation. The scroll wheel 202 and the control circuit 204 may be coupled with each other, like indicated by line 250, for example electrically coupled, for example using a line or a cable, and/or mechanically coupled.

In other words, according to various embodiments, the input device 200 may include a scroll wheel 202. The scroll wheel 202 may be an input member configured to receive a user input. A user may provide the user input by moving the scroll wheel 202. The scroll wheel 202 may be at least substantially circular and may be rotatable about an axis through its centre. The scroll wheel 202 may be rotatable in a plane, in at least one of a clockwise direction or an anticlockwise direction. The scroll wheel 202 may alternatively be at least substantially spherical in shape, and may be rotatable in three dimensions to provide scrolling inputs in two axes. The input device 200 may further include a control circuit 204. The control circuit 204 may be configured to translate the movements of the scroll wheel 202 into scrolling inputs. The scrolling inputs may be provided to an application, such as to move a cursor or a selection on the graphical user interface of the application. The control circuit 204 may provide only a predetermined number of steps, for example one step of scrolling input to the application, every time the scroll wheel 202 is rotated, even if the scroll wheel 202 is rotated to more than one step or degree of rotation. The input device 200 may be a peripheral device that is couplable to a computing device, for example the input device may be any one of a computer mouse, a game controller or other types of input devices. The input device 200 may also be an integrated device including the computing device, for example the input device 200 may be a mobile phone or a portable gaming machine or a laptop. The scroll wheel 202 may be any one of a mouse scroll wheel, a track wheel, a thumbwheel or a trackball.

According to various embodiments, the control circuit 204 may further be configured to translate the movements of the scroll wheel 202 into scrolling inputs based on the angle of scroll wheel rotation. The control circuit 204 may provide a plurality of scrolling inputs to an application, every time the scroll wheel 202 is rotated. The plurality of scrolling inputs may correspond to the angle of rotation of the scroll wheel 202.

Figure 3:
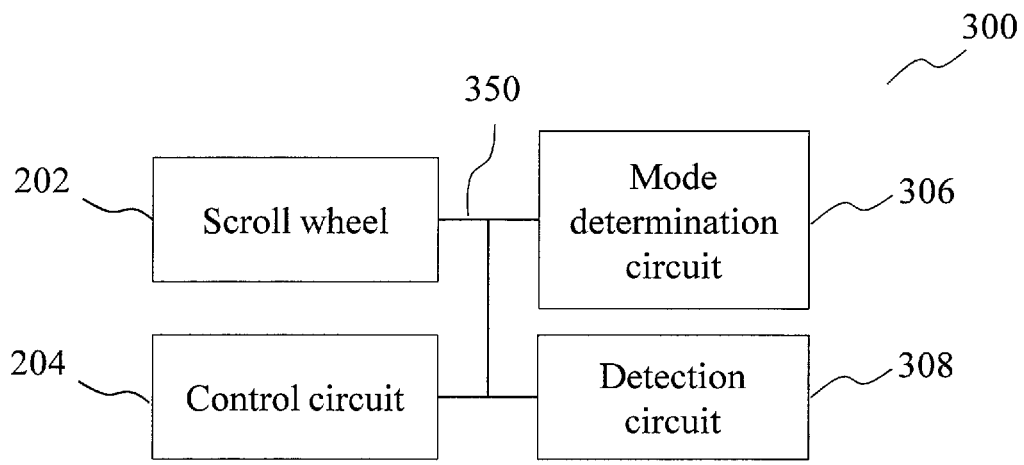
FIG. 3 shows a conceptual diagram of an input device according to various embodiments.

FIG. 3 shows a conceptual diagram of an input device 300 according to various embodiments. The input device 300 may be similar to the input device 200 in that it may also include the scroll wheel 202 and the control circuit 204. The input device 300 may further include a mode determination circuit 306. The mode determination circuit 306 may be configured to determine a scrolling control mode to be used, from a first scrolling control mode and a second scrolling control mode, and to instruct the control circuit 204 accordingly. The mode determination circuit 306 may receive a mode selection input indicating a choice of the scrolling control mode. The scrolling control mode may be toggled between the first scrolling control mode and the second scrolling control mode. When controlling the input device in the first scrolling control mode, the control circuit 204 may be configured to provide exactly a predetermined number of steps of scrolling input for every instance of rotation of the scroll wheel regardless of the angle that the scroll wheel is rotated through in the instance of rotation. When controlling the input device in the second scrolling control mode, the control circuit 204 may be configured to provide a plurality of steps of scrolling input for every instance of rotation of the scroll wheel 202. A number of steps in the plurality of steps may correspond to the angle that the scroll wheel 202 is rotated through in the instance of rotation. The input device 300 may also include a detection circuit 308. The detection circuit 308 may be configured to detect at least one of a start of an instance of rotation of the scroll wheel 202 or an end of the instance of rotation of the scroll wheel 202. The detection circuit 308 may detect the at least one of the start of the instance of rotation or the end of the instance of rotation when a change in a rotation speed of the scroll wheel 202 exceeds a predetermined threshold. The predetermined threshold may be user configurable through a user interface on the input device or through a software configuration. The detection circuit 308 may also detect the start of the instance of rotation when the scroll wheel 202 transits from being stationary to rotating, and may also detect the end of the instance of the rotation when the scroll wheel 202 transits from being rotating to being stationary. The detection circuit 308 may also be configured to detect at least one of the start of the instance of rotation or the end of the instance of rotation when the scroll wheel 202 transits from rotating in a first direction to rotating in a second direction. The second direction may be different from the first direction, and may be opposite to the first direction. The scroll wheel 202, the control circuit 204, the mode determination circuit 306 and the detection circuit 308 may be coupled with each other, like indicated by lines 350, for example electrically coupled, for example using a line or a cable, and/or mechanically coupled.

Figure 4:
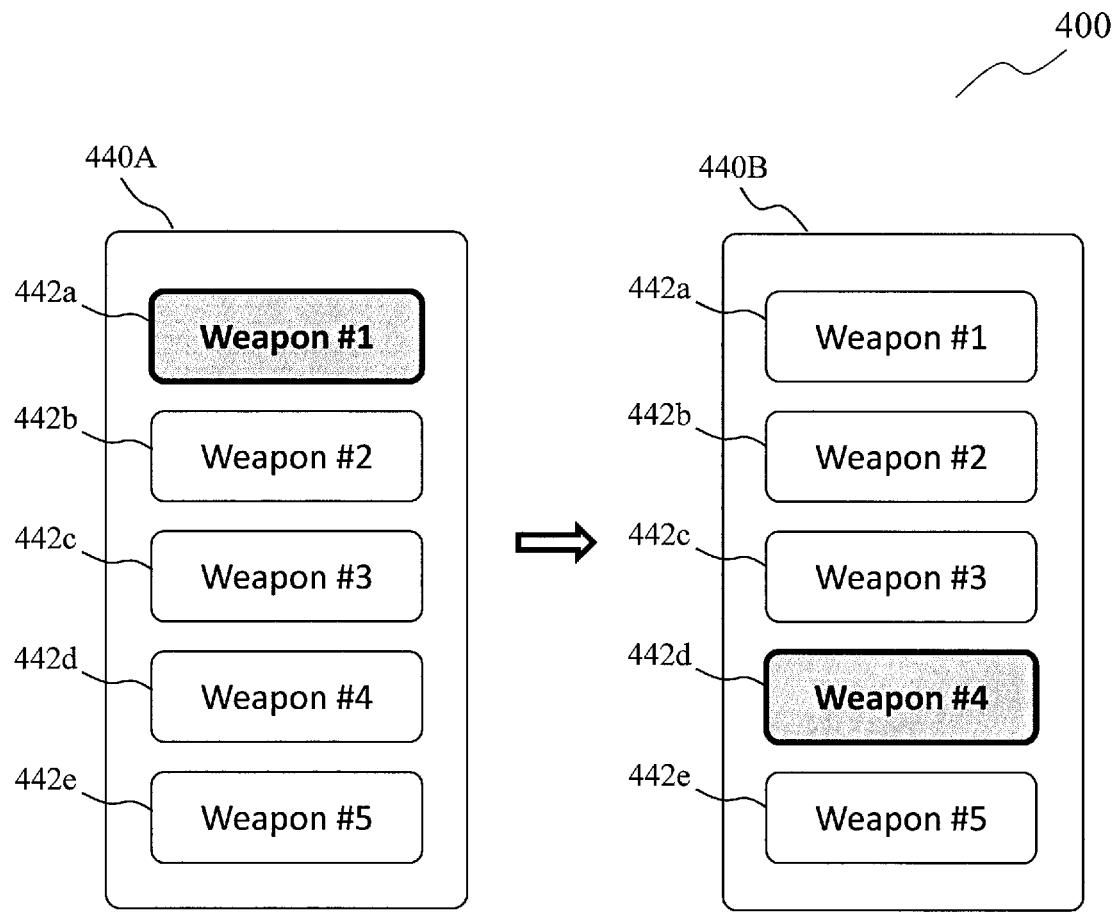
FIG. 4 shows a menu selection process according to various embodiments.

FIG. 4 shows a menu selection process 400 using an input device according to various embodiments. The input device may be the input device 100, input device 200 or the input device 300. The input device may include a scroll wheel 202, a control circuit 204, a mode determination circuit 306 and a detection circuit 308. FIG. 4 shows a menu in at an initial state 440A and the same menu at a later state 440B after receiving a scrolling input. The menu may include a plurality of items that can be selected, for example in a gaming application, the plurality of items may include Weapon #1 442a, Weapon #2 442b, Weapon #3 442c, Weapon #4 442d and Weapon #5 442e. A user of the input device may use the scroll wheel 202 to select one item from the menu. In the initial state 440A, the selection as indicated by shading and bold outline, may be the first item in the menu, Weapon #1 442a. If the user wishes to select Weapon #4 442d, the user would have to control the scroll wheel 202 to move the selection to Weapon #4 442d.

The user may choose to operate the input device in one of a multi-step operation mode or a single-step operation mode. The mode determination circuit 306 may determine the user's choice of operation mode. If the mode determination circuit 306 determines that the user-selected mode is the multi-step mode, the user would have to rotate the scroll wheel 202 downwards by an amount of rotation that is equivalent to 3 scrolling steps, in order to shift the selection to Weapon #4 442d. As an example, if the scroll wheel 202 has 24 steps per revolution of 360°, i.e. 15° per step, the user should rotate the scroll wheel 202 by 3*15°=45° to make the desired selection. However, it may be difficult for the user to rotate the scroll wheel 202 exactly by 45°, especially when the user has to make the selection fast. In order to make the selection fast, the user may tend to rotate the scroll wheel 202 quickly and as a result, may inadvertently rotate the scroll wheel 202 by more than 45°. When the scroll wheel 202 is rotated by more than 45°, the selection may proceed to Weapon #5 442e instead of Weapon #4 442d. When this happens, the user would have to either scroll upwards by one step which requires rotation of the scroll wheel 202 upwards by 15° or to re-scroll the menu by scrolling downwards by 5 steps which requires rotation of the scroll wheel 202 downwards by 75°. Either way, there is still a risk that the user may over-scroll or under-scroll to the wrong selection.

The user may alternatively operate the input device in the single-step mode. In the single-step mode, the user may rotate the scroll wheel 202 once to shift the selection from Weapon #1 442a to Weapon #2 442b, rotate the scroll wheel 202 again to shift the selection from Weapon #2 442b to Weapon #3 442c, then rotate the scroll wheel 202 again to shift the selection from Weapon #4 442d. Every time the user rotates the scroll wheel 202, the detection circuit 308 may detect whether a new instance of rotation is made. When the detection circuit 308 detects a new instance of rotation, the control circuit 204 may provide exactly a predetermined number of steps of scrolling input to the application. The predetermined number of steps of scrolling input may be one step of scrolling input. In other words, the user may rotate the scroll wheel 202 three times to execute three scrolling steps. The user does not have to control the angle of rotation for each instance of rotation, as the angle of rotation is not translated into scrolling units under the single-step mode. The user may be able to know precisely how many steps the scrolling will register. As such, there is little risk of over scrolling or under scrolling, as the number of units of scrolling is only based on the number of instances that the scroll wheel 202 is rotated. It may be easier for the user to keep track of the number of times he moves the scroll wheel 202, as opposed to keeping track of the amount of rotation that the scroll wheel 202 goes through by feeling the tactile feedback that comes with each scroll wheel step. Scroll wheel tactile feedback may be difficult to feel during action intensive game play whereby on screen happenings may require the user's undivided concentration. The detection circuit 308 may determine a start of a new instance of rotation when a stationary scroll wheel 202 moves, or when a moving scroll wheel 202 changes its direction of rotation, or when a moving scroll wheel 202 accelerates, i.e. moves at a faster speed. The detection circuit 308 may determine an end of the instance of rotation when the moving scroll wheel 202 stops moving, or when the moving scroll wheel 202 decelerates.

Figure 5:
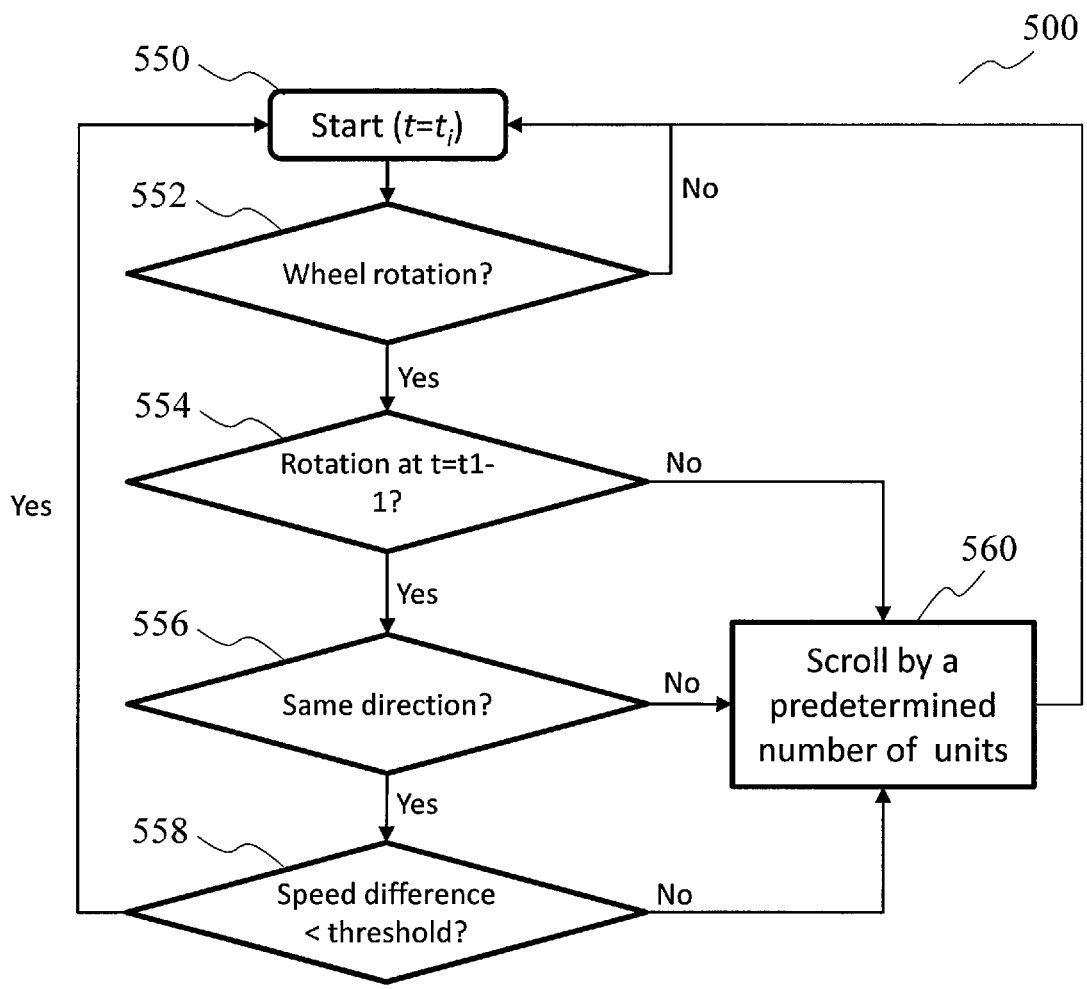
FIG. 5 shows a logic diagram of a method for providing a scrolling input to an application, according to various embodiments.

FIG. 5 shows a logic diagram 500 of a method for providing a scrolling input to an application, according to various embodiments. The method may include a process executed by a processor. The processor may be part of an input device, or part of a computing device coupled to the input device. The input device may be any one of the input device 100, the input device 200 or the input device 300. The input device may include a scroll wheel 102 or a scroll wheel 202. The process may start at a start state 550. The time of starting the process may be indicated as $t=_{ti}$. Next, the processor may proceed to step 552, it may be determined whether the scroll wheel is rotated. If the scroll wheel is not rotated, i.e. is stationary, the process may re-start back at start state 550. If the scroll wheel is rotated, the process may proceed to step 554 where it may be determined whether the scroll wheel was rotating at the previous time step. The previous time step is indicated as $t=_{ti-1}$ in the logic diagram 500. If the scroll wheel was not rotating at the previous time step, i.e. the scroll wheel was previously stationary, the process may proceed to scroll state 560 to generate a predetermined number of units of scrolling input to the application. If the scroll wheel was rotating at the previous time step, i.e. the scroll wheel was already in motion, the process may proceed to step 556 to determine whether the scroll wheel was moving in the same direction at the previous time step. In other words, at step 556, it may be determined whether the scroll wheel was simply continuing its previous state of motion i.e. still in an existing instance of rotation, or the scroll wheel has changed its direction of rotation to start a new instance of rotation. If the scroll wheel was not moving in the same direction, the process may proceed to the scroll state 560 to generate a predetermined number of units of scrolling input to the application. If the scroll wheel was already moving in the same direction, the process may proceed to step 558 to determine whether the scroll wheel is scrolling at a different speed from its speed at the previous time step. The difference in speed at the previous time step and the speed at time $t=_{ti}$ may be compared to a predetermined threshold. If the difference is less than the threshold, the process may return to the start state 550. If the difference is larger than the threshold, for example, if the scroll wheel is moving at a faster speed following a pre-determined period of slower speed from the previous time step, the scroll wheel may have started on a new instance of rotation. The process may then proceed to the scroll state 560 to generate a predetermined number of units of scrolling input. After the scroll state 560 is reached, the method may automatically return to the start state 550.

Figure 6:
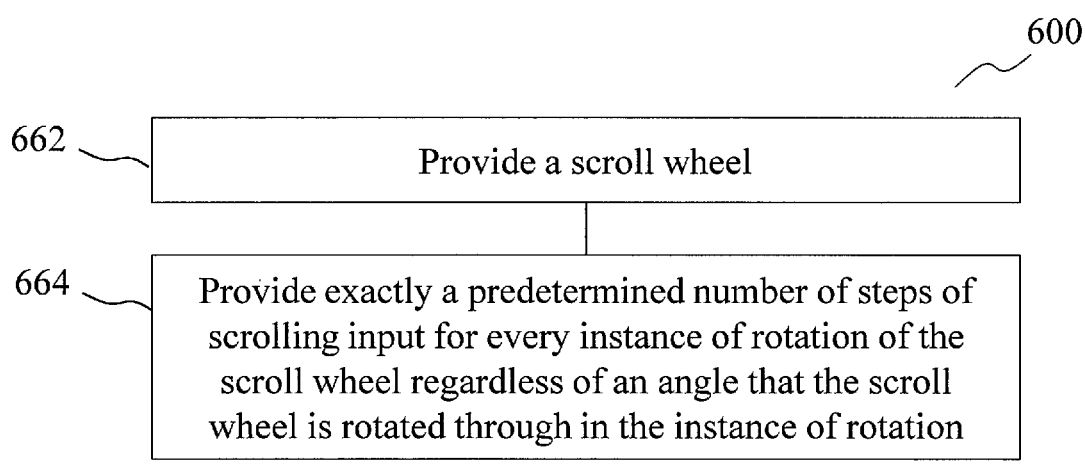
FIG. 6 shows a flow diagram illustrating a method for providing a scrolling input to an application, according to various embodiments.

FIG. 6 shows a flow diagram 600 illustrating a method for providing a scrolling input to an application, according to various embodiments. The method may include a first step 662, wherein a scroll wheel may be provided. The method may further include a second step 664, wherein exactly a predetermined number of steps of scrolling input may be provided for every instance of rotation of the scroll wheel, regardless of an angle that the scroll wheel may be rotated through in the instance of rotation. The method may further include a third step in which at least one of a start of an instance of rotation of the scroll wheel or an end of the instance of rotation of the scroll wheel, is detected. The detection of the start or end of the instance of rotation may include detecting a change in the rotation speed of the scroll wheel and determining whether the change in speed exceeds a predetermined threshold. For example, if the scroll wheel is moving at a faster speed following a pre-determined period of slower speed from the previous time step, the scroll wheel may have started on a new instance of rotation. The detection of the start of the instance of rotation may also include detecting when the scroll wheel transits from being stationary to rotating while detecting the end of the instance of rotation may include detecting when the scroll wheel transits from being rotating to being stationary. The start or end of the instance of rotation may also be detected by detecting a change in the direction of the rotation of the scroll wheel.

According to various embodiments, a non-transitory computer readable medium may be provided. The non-transitory computer readable medium may store instructions which may be executed by a processor. When the instructions are executed by the processor, the processor may perform the method shown in FIG. 6. The method may include providing exactly a predetermined number of steps of scrolling input for every instance of rotation of a scroll wheel of the input device, regardless of an angle that the scroll wheel is rotated through in the instance of rotation.

According to various embodiments, the input device may be a touchpad. The input device may receive user inputs via touch gestures applied to the touchpad. The input device may include a control circuit configured to provide exactly a predetermined number of steps of scrolling input for every instance of touch gesture regardless of a length of the touch gesture.

The following examples pertain to further embodiments.

Example 1 is an input device for providing a scrolling input to an application, the input device including: a scroll wheel; and a control circuit configured to provide exactly a predetermined number of steps of scrolling input for every instance of rotation of the scroll wheel regardless of an angle that the scroll wheel is rotated through in the instance of rotation.

In example 2, the subject-matter of example 1 can optionally include a detection circuit configured to detect at least one of a start of an instance of rotation of the scroll wheel or an end of the instance of rotation of the scroll wheel.

In example 3, the subject-matter of example 2 can optionally include that the detection circuit is configured to detect the at least one of the start of the instance of rotation or the end of the instance of rotation when a change in a rotation speed of the scroll wheel exceeds a predetermined threshold.

In example 4, the subject-matter of example 2 or example 3 can optionally include that the detection circuit is configured to detect the start of the instance of rotation when the scroll wheel transits from being stationary to rotating.

In example 5, the subject-matter of any one of examples 2 to 4 can optionally include that the detection circuit is configured to detect the end of the instance of rotation when the scroll wheel transits from being rotating to being stationary.

In example 6, the subject-matter of any one of examples 2 to 5 can optionally include that the detection circuit is configured to detect the at least one of the start of the instance of rotation or the end of the instance of rotation when the scroll wheel transits from rotating in a first direction to rotating in a second direction, the second direction being opposite to the first direction.

In example 7, the subject-matter of any one of examples 1 to 6 can optionally include a mode determination circuit configured to determine a scrolling control mode to be used from a first scrolling control mode and a second scrolling control mode and to instruct the control circuit accordingly.

In example 8, the subject-matter of example 7 can optionally include that the control circuit is configured to, when controlling the input device in the first scrolling control mode, provide exactly the predetermined number of steps of scrolling input for every instance of rotation of the scroll wheel regardless of the angle that the scroll wheel is rotated through in the instance of rotation.

In example 9, the subject-matter of example 7 or example 8 can optionally include that the control circuit is configured to, when controlling the input device in the second scrolling control mode, provide a plurality of steps of scrolling input for every instance of rotation of the scroll wheel, wherein a number of steps in the plurality of steps correspond to the angle that the scroll wheel is rotated through in the instance of rotation.

In example 10, the subject-matter of any one of examples 1 to 9 can optionally include that the scroll wheel is a ratchet scroll wheel.

In example 11, the subject-matter of any one of examples 1 to 9 can optionally include that the scroll wheel is a ratchet-less scroll wheel.

In example 12, the subject-matter of any one of examples 1 to 11 can optionally include that the input device is a computer mouse.

In example 13, the subject-matter of any one of examples 1 to 11 can optionally include that the input device is a touch pad.

In example 14, the subject-matter of any one of examples 1 to 13 can optionally include that the scroll wheel is a scroll ball.

Example 15 is a method for providing a scrolling input to an application, the method including: providing a scroll wheel; and providing exactly a predetermined number of steps of scrolling input for every instance of rotation of the scroll wheel regardless of an angle that the scroll wheel is rotated through in the instance of rotation.

In example 16, the subject-matter of example 15 can optionally include detecting at least one of a start of an instance of rotation of the scroll wheel or an end of the instance of rotation of the scroll wheel.

In example 17, the subject-matter of example 16 can optionally include that detecting the at least one of the start of the instance of rotation or the end of the instance of rotation includes detecting a change in a rotation speed of the scroll wheel and determining whether the change exceeds a predetermined threshold.

In example 18, the subject-matter of example 16 or example 17 can optionally include that detecting the start of the instance of rotation includes detecting when the scroll wheel transits from being stationary to rotating.

In example 19, the subject-matter of any one of examples 16 to 18 can optionally include that detecting the end of the instance of rotation includes detecting when the scroll wheel transits from being rotating to being stationary.

In example 20, the subject-matter of any one of examples 16 to 19 can optionally include that detecting the at least one of the start of the instance of rotation or the end of the instance of rotation includes detecting a change in a direction of the rotation of the scroll wheel.

Example 21 is a non-transitory computer readable medium having stored therein instructions which when executed by a processor, causes the processor to perform a method for providing a scrolling input using an input device, the method including: providing exactly a predetermined number of steps of scrolling input for every instance of rotation of a scroll wheel of the input device, regardless of an angle that the scroll wheel is rotated through in the instance of rotation.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. An input device for providing a scrolling input to an application, the input device comprising:
   a scroll wheel; and
   a control circuit configured to provide exactly a single step of scrolling input to the application for any amount of an instance of rotation of the scroll wheel regardless of an angle that the scroll wheel is rotated through in the instance of rotation,
   wherein the input device is a computer mouse,
   further comprising:
   a detection circuit configured to detect at least one of a start of an instance of rotation of the scroll wheel or an end of the instance of rotation of the scroll wheel, wherein the detection circuit is configured to detect the start of the instance of rotation when the scroll wheel transits from rotating in a first direction to rotating in a second direction.

2. The input device of claim 1, wherein the detection circuit is configured to detect the end of the instance of rotation when a change in a rotation speed of the scroll wheel exceeds a predetermined threshold.

3. The input device of claim 1, wherein the detection circuit is configured to detect the end of the instance of rotation when the scroll wheel transits from being rotating to being stationary.

4. The input device of claim 1, wherein the detection circuit is configured to detect the end of the instance of rotation when the scroll wheel transits from rotating in a first direction to rotating in a second direction, the second direction being opposite to the first direction.

5. The input device of claim 1, further comprising:
   a mode determination circuit configured to determine a scrolling control mode to be used from a first scrolling control mode and a second scrolling control mode and to instruct the control circuit accordingly.

6. The input device of claim 5, wherein the control circuit is configured to, when controlling the input device in the first scrolling control mode, provide exactly the single step of scrolling input to the application for any amount of the instance of rotation of the scroll wheel regardless of the angle that the scroll wheel is rotated through in the instance of rotation.

7. The input device of claim 5, wherein the control circuit is configured to, when controlling the input device in the second scrolling control mode, provide a plurality of steps of scrolling input for every instance of rotation of the scroll wheel, wherein a number of steps in the plurality of steps correspond to the angle that the scroll wheel is rotated through in the instance of rotation.

8. The input device of claim 1, wherein the scroll wheel is a ratchet scroll wheel.

9. The input device of claim 1, wherein the scroll wheel is a ratchet-less scroll wheel.

10. The input device of claim 1, wherein the scroll wheel is a scroll ball.

11. The input device of claim 1, wherein the control circuit is configured to control the input device in a single-step scrolling control mode activated via a pre-programmed input button.

12. The input device of claim 1, wherein the second direction is opposite to the first direction.

13. A method for providing a scrolling input to an application, the method comprising:
   providing a scroll wheel; and
   providing exactly a single step of scrolling input to the application for any amount of an instance of rotation of the scroll wheel regardless of an angle that the scroll wheel is rotated through in the instance of rotation,
   wherein the input device is a computer mouse,
   further comprising:
   detecting at least one of a start of an instance of rotation of the scroll wheel or an end of the instance of rotation of the scroll wheel, wherein detecting the start of the instance of rotation comprises detecting a change in a direction of the rotation of the scroll wheel.

14. The method of claim 13, wherein detecting the end of the instance of rotation comprises detecting a change in a rotation speed of the scroll wheel and determining whether the change exceeds a predetermined threshold.

15. The method of claim 13, wherein detecting the end of the instance of rotation comprises detecting when the scroll wheel transits from being rotating to being stationary.

16. The method of claim 13, wherein detecting the end of the instance of rotation comprises detecting a change in a direction of the rotation of the scroll wheel.

17. A non-transitory computer readable medium having stored therein instructions which when executed by a processor, causes the processor to perform a method for providing a scrolling input to an application using an input device, the method comprising:
   providing exactly a single step of scrolling input to the application for any amount of an instance of rotation of a scroll wheel of the input device, regardless of an angle that the scroll wheel is rotated through in the instance of rotation,
   wherein the input device is a computer mouse,
   further comprising:
   a detection circuit configured to detect at least one of a start of an instance of rotation of the scroll wheel or an end of the instance of rotation of the scroll wheel, wherein the detection circuit is configured to detect the start of the instance of rotation when the scroll wheel transits from rotating in a first direction to rotating in a second direction.

* * * * *